(12) United States Patent
Lafetra

(10) Patent No.: X7971
(45) Date of Patent: Jan. 23, 1834

(54) LEVER POWER

(76) Inventor: Tyles W. Lafetra

Tyler W. Safetra — New York.

Letters Patent Dated January 23 d. 1834.

The Schedule referred to in these Letters Patent and making part of the same; containing a description in the words of the said Tyler W. Safetra himself, of his improvement in the Lever Power.

To all to whom these presents shall come: Be it known that I, Tyler W. Safetra, of the City, County and State of New York, have invented a new and useful improvement in the Lever Power; and that the following is a full and exact description of the construction and operation of the improvement, as invented or improved by me.

The new improvement as herein claimed consists in applying a contracting and expanding pitman or coupling rod, composed of pieces of iron, or other suitable substances, connected together in an angular form, plying or turning on pinions, pivots, gudgeons or bolts, at the centres and each end to a lever or beam by the aid of which a crank equal in length to half the vibration or motion of the lever or beam may be turned, having one eighth the length of lever or beam for a fulcrum, and if steam be applied to the extremity of the said lever or beam, the crank turned may be equal in length to the motion of the piston rod by the centre. It may also be applied to a Rail Road Carriage or Car operated on by steam, or other power, or, to any machinery constructed with a lever, lever beam, piston, piston rod and crank, or any other lever power operated upon by any power, whether the improvement be applied to machinery in a simple or compound form.

Witnesses.

Richd. H. Browne

Morris Franklin

Tyler W. Safetra ([illegible]) (Rec'd & Recorded anew Nov. 27, 1841) Exd. [illegible]

[illegible] be made